United States Patent Office 3,586,656
Patented June 22, 1971

3,586,656
STABILIZATION OF ORGANIC MATERIALS WITH PHENOLIC POLYPHOSPHITES
Patrick A. De Paolo, Jr., Prospect, and Richard A. Doran, Middlebury, Conn., assignors to Uniroyal, Inc.
No Drawing. Original application Feb. 6, 1967, Ser. No. 614,028, now Patent No. 3,509,241, dated Apr. 28, 1970. Divided and this application Oct. 16, 1969, Ser. No. 867,072
Int. Cl. C08f 45/58
U.S. Cl. 260—45.8
13 Claims

ABSTRACT OF THE DISCLOSURE

New phenolic polyphosphite-containing compositions, which are reaction products of $PCl_3$ with a substituted hydroquinone (e.g., 2,5-di(t-butyl) hydroquinone), in molar ratio of from 1.2:3.0 to 1.9:3.0. The reaction products are believed to comprise in large part phenolic polyphosphites of the formula $P_x(ORO)_y(OROH)_z$, where $x$ is at least 2 and R is a substituted p-phenylene radical. The phenolic polyphosphate reaction products are useful as stabilizers, particularly in polypropylene, especially in synergistic combination with one or more secondary stabilizers such as thiodipropionates, benzophenones, or benzotriazoles, for optimum protection against both heat aging and ultraviolet radiation.

CROSS-REFERENCES TO RELATED APPLICATIONS

This application is a division of our copending application Ser. No. 614,028, filed Feb. 6, 1967, now U.S. Pat. 3,509,241, issued Apr. 28, 1970.

Copending application Ser. No. 506,881 of G. D. Brindell, filed Nov. 8, 1965, now U.S. Pat. 3,467,737, issued Sept. 16, 1969, discloses certain phenolic monophosphites, while copending application Ser. No. 506,867 of G. D. Brindell, filed Nov. 8, 1965, now U.S. Pat. 3,412,064, issued Nov. 19, 1968, discloses stabilized polypropylene composition based on such phenolic monophosphites. Copending application Ser. No. 506,860 of B. A. Hunter, filed Nov. 8, 1965, now U.S. Pat. 3,467,735, issued Sept. 16, 1969, discloses certain phenolic monophosphites derived from hydroquinone substituted with secondary alkyl, terpenyl, or aralkyl groups, and the stabilization of diolefin polymers therewith. The products of said copending applications are essentially monophosphites as opposed to polyphoshites because of the low ratio of phosphorus trihalide to phenol used in preparing the products (one-third mole of $PCl_3$ per mole of dihydric phenol). The present polyphosphite reaction products, made with higher ratios of phosphorus trihalide, can be produced in higher yields and have less tendency to discolor materials with which they are mixed. Furthermore, when the present products are subjected in use to conditions which bring about hydrolysis, they do not form color-producing bodies whereas the monophosphites hydrolyze to discoloring materials. In addition the present polyphosphite reaction products are more effective stabilizers than the monophosphites, as will appear in the working examples below.

BACKGROUND OF THE INVENTION

(1) Field of the invention

This invention relates to new compositions of matter which are reaction products of a substituted hydroquinone with sufficient phosphorus trihalide to produce a polyphosphite, but insufficient to react with all of the hydroxyl groups of the hydroquinone, that is, reaction products of from .4 to .63 mole of phosphorus trihalide per mole of substituted hydroquinone. Additionally, the invention relates to the use of such reaction products, which are comprised largely of phenolic polyphosphites, for preventing degradation of organic materials caused by heat, oxidation or ultraviolet radiation.

(2) Description of the prior art

In U.S. Pat. 2,612,488 issued to Nelson on Sept. 30, 1952 there are disclosed stabilizers made by condensing $PCl_3$ with a monohydric phenol, followed by condensation of the resulting product with a dihydric phenol. Equimolar proportions of the monohydric phenol, $PCl_3$ and dihydric phenol are employed in Nelson with the result that there is little or no phenolic hydroxyl in the product of Nelson. The present products in contrast are not made with a mole of monohydric phenol (i.e., they are not based on >P—OR groups) and furthermore they are prepared in such a way as to have a high content of available phenolic hydroxyl groups in the product. The present products surprisingly are highly useful not only as stabilizers against the effect of heat but also against ultraviolet radiation, and they display remarkable synergistic stabilizing effects with thiodipropionates and other secondary stabilizers such as benzophenones, particularly in polypropylene. In this respect the present chemicals are unlike the monohydric phenol-based products of Nelson, in which the ratio of phosphorus halide to phenolic hydroxyl in the reactants is so high that the phenolic hydroxyls are essentially entirely consumed in the preparation of the products.

SUMMARY OF THE INVENTION

The new phenolic polyphosphite-containing reaction products of the invention are reaction products of a phosphorus trihalide and a substituted hydroquinone in molar ratio of from 1.2:3.0 to 1.9:3.0. The substituted hydroquinone has the formula (I)
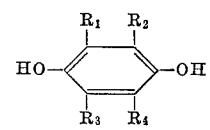

wherein $R_1$, $R_2$, $R_3$ and $R_4$ are the same or different and are selected from the group consisting of hydrogen, alkyl, aralkyl, and terpenyl, at least one R being other than hydrogen.

The reaction products of the invention are believed to comprise in large part chemicals having the formula (II) $\qquad P_x(ORO)_y(OROH)_z$ wherein $x$ is at least 2 and is equal to $2y/3$ plus $z/3$, and $z$ is a whole or fractional multiple of $x$ in the range from 0.25 to $2x$, R is the same or different in each —ORO— group and is a substituted para phenylene radical (i.e., substituted hydroquinone residue) of the formula (III)
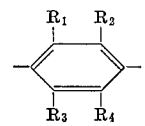

wherein $R_1$, $R_2$, $R_3$ and $R_4$ are as previously defined in connection with the substituted hydroquinone of Formula I, above. In the preferred reaction products, 20 to 30% of the hydroxyl groups from the starting material remain available in the polyphosphite molecules of the final product.

It is believed that the main component of the reaction product of the invention having the foregoing formula can exist in two forms, one of which is linear, and the other of which is cross-linked. Preferred products of the invention are believed to be comprised largely of linear molecules having the formula (IV)

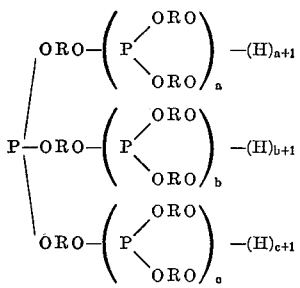

wherein R is as defined in connection with Formula II, above, and $a$, $b$ and $c$ are zero or whole numbers adding up to from 1 to 20, at least one of $a$, $b$, and $c$ being other than zero. In practice, the typical reaction products of the invention are believed to include, along with the foregoing linear forms, a minor amount of cross-linked forms, that is, forms in which two phosphorus atoms may be connected together through more than one —ORO— grouping, as in the grouping (V) 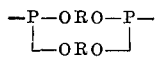

where R is the substituted hydroquinone residue previously defined. In general the cross-linked forms are believed to be made up of molecules which include groupings wherein some of the phosphorus atoms in Formula II, above, are present as a unit having the structure (VI)

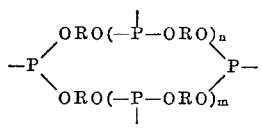

where $m$ and $n$ are zero or small numbers (e.g., 1 to 5) and R is the substituted hydroquinone residue (substituted para-phenylene radical) previously defined.

DESCRIPTION OF THE PREFERRED EMBODIMENTS

The invention contemplates preparation of reaction products of the kind described by heating a phosphorus trihalide, such as phosphorus trichloride or tribromide, and a substituted hydroquinone in an organic solvent medium. The organic solvents suitable for this purpose are those volatile solvents in which the reactants are at least partially soluble and which are inert under the conditions of the reaction, e.g., chlorobenzene, xylene, toluene, ethyl ether, butyl ether, etc. Reaction temperatures in the range of from 25° C. to 250° C. are suitable. Optionally, the reaction mixture may include a suitable catalyst for phosphite ester preparations such as diphenyl phosphite or other catalyst as disclosed for example in U.S. Pat. 3,053,878. The resulting reaction product may be recovered from the reaction mixture by any suitable means, such as by distilling off the solvent. Preferred substituted hydroquinones are those in which the substituents $R_1$, $R_2$, $R_3$ and $R_4$ as shown in Formula I, above, are selected from hydrogen, alkyl, aralkyl and terpenyl. Examples of suitable alkyl groups, in addition to methyl, ethyl, n-propyl and isopropyl, include normal, secondary or tertiary butyl, amyl, nonyl, dodecyl, octadecyl, etc. Thus, monoalkyl-substituted, di-alkyl substituted (e.g., 2,5- or 3,5-), or tri-alkyl substituted hydroquinones may be mentioned. The secondary alkyl substituted hydroquinones obtained by reacting mixed alpha-olefins with hydroquinone are suitable. Suitable aralkyl substituted hydroquinones includes those made by reacting styrene or alpha-alkyl styrenes (e.g., alpha-methyl styrene) with hydroquinone. Suitable substituted hydroquinones may be provided by reacting one or more terpenes with hydroquinone. The terpenes may be defined in the conventional manner as including the $C_{10}H_{16}$ hydrocarbons having what has been termed isoprenoid structure. The terpenes may be monocyclic, polycyclic, or acyclic. The terpenes are represented by such materials as alpha-pinene, beta-pinene, camphene, limonene, carene, dipentene, terpene, and the like. Mixed products of natural origin, such as turpentine (largely alpha-pinene with varying quantities of beta-pinene and other terpenes, depending upon the source) are suitable sources of the terpenyl group. Equivalent to the foregoing terpene radicals for purposes of the invention is the isobornyl radical as provided for example by reacting camphene or the like with hydroquinone.

Particularly preferred substituted hydroquinones for use in making the reaction products of the invention are the 2,5-dialkyl substituted hydroquinones, notably those in which the alkyl groups are tertiary alkyl, especially tertiary butyl and tertiary amyl.

Also useful as starting products are the substituted hydroquinones containing halogen, such as 2,5-di(t-butyl)-3-chloro-hydroquinone, 2-(t-butyl)-5-bromo-hydroquinone, 2-(alpha-methyl butyl)-5-chlorohydroquinone, and the like.

If desired, the phenolic reactant material consisting essentially of substituted hydroquinone may take the form of a mixture of more than one substituted hydroquinone, or substituted hydroquinones with more than one kind of substituent, in making the reaction products of the invention.

Preferred product of the invention contain 3 phosphorus atoms or more, e.g. 5–10 or more phosphorus atoms. In practice, any given preparation may contain phenolic polyphosphites of more than one kind, having different numbers of phosphorus atoms.

In many products of the invention, the linear constituents of the Formula IV shown above are such that the sub-scripts $a$, $b$, and $c$ in said formula add up to from 2 to 8. In a given preparation more than one kind of molecule is ordinarily present and therefore the average values of the sub-scripts $a$, $b$, and $c$ in Formula IV, or of $x$, $y$, and $z$ in Formula II, for the entire preparation may not always be whole numbers.

Although in preferred reaction products of the invention the linear structure IV predominates over the cross-linked structure VI, nevertheless it is possible to prepare products in which the molecules of Formula II, above, are predominantly or almost exclusively present in the cross-linked phenolic polyphosphite form VI. Formation of cross-linked structure is in general favored by more severe reaction conditions (higher reaction temperatures, longer reaction times).

In many cases the preferred largely linear phenolic polyphosphites-containing reaction products of the invention derived from di(lower alkyl) substituted hydroquinone have a mole ratio of hydroxyl content to phosphorus content of from about 1 to 1.6 (phosphorus contents from about 6.2 to 5.8% by weight for most preferred products), although phosphorus content can vary greatly with other preferred products due to variation in size and number of the substituent groups on the hydroquinone groups in the molecules. These frequently have melting points of the order of 80–130° C. Other less preferred products derived from di(lower alkyl) substituted hydroquinones believed to have a more highly cross-linked structure, may have a mole ratio of hydroxyl to phosphorus from about 0.3 to 0.9 (typical phosphorus contents of 8.1 to 6.7% by weight) and they are higher melting, frequently melting within the range of from 200 to 350° C.

In place of preparing the polymeric reaction products of the invention directly in one stage, it is possible to carry out a two stage preparation in which a trisphenolic monophosphite is first prepared by reaction of one mole of phosphorus trihalide with three moles of substituted hydroquinone (cf. the copending applications referred to above); in a second stage this intermediate trisphenolic monophosphite is reacted with further phosphorus trihalide to yield the product of the invention having a higher phosphorus content than the tris monophosphite. Preferred products are formed when the amount of phosphorus trihalide reacted with the intermediate is enough to consume only 20–80% of the available hydroxyl groups of the intermediate.

Although the reaction products of the invention are believed to be comprised in large part of materials having the structural formulas shown above, it will be understood that the formulas do not necessarily represent the sole materials present in the product. It is possible that the products also include phosphate-phosphonate compounds or other by-products or various impurities. It is unnecessary to separate pure products from the reaction product since the crude reaction products are highly effective, possibly by reason of the presence of other materials along with the materials having the described structure. Further, it may be observed that changes in the reaction product occur with aging, especially if heated, but these are not necessarily undesirable. Structural changes which sometimes appear to take place may include an increase in the content of cross-linked species, or other unknown changes may take place.

The phosphorus trihalide-substituted hydroquinone reaction products of the invention are useful as stabilizers for organic materials, against the deteriorating effects of such adverse influences as heat, oxygen and ultraviolet radiation. Particular mention may be made of the stabilization of polymers with the products of the invention, whether resinous plastics or rubbery polymers. In a highly preferred form of the invention, the present reaction products are employed in stabilizing systems for polyolefin plastics, such as polyethylene, polypropylene and similar plastic polymers or copolymers of alpha-olefins of the ethylene series. The reaction products of the invention may also be used in other polymers such as polystyrene, high impact polystyrene, polyvinyl chloride, polyvinyl fluoride, polyesters, polyethers, polyurethanes, polyacrylates, polycarbonates, ethylene-vinyl acetate copolymers, polyisobutylene, elastomers based on conjugated dienes, including homopolymers of butadiene (emulsion-prepared or solution-prepared), isoprene (natural rubber or synthetic cis-polyisoprene) and copolymers of such dienes with copolymerizable ethylenically unsaturated monomers such as styrene (e.g., SBR, solution-prepared or emulsion-prepared), acrylonitrile (e.g., NBR), acrylates, carboxylated monomers, and the like; also ethylene-propylene copolymer rubbers and ethylene-propylene-nonconjugated diene (e.g., dicyclopentadiene, 1,4-hexadiene, methylene norbornene) terpolymer rubbers, poly-4-methyl pentene-1 and polymers of other substituted butenes, pentenes, hexenes, etc., polyacetals, polyphenylene oxide, polyamides, urethane-polycarbonate copolymers, styrene-acrylonitrile resins, ABS plastics (whether physical mixtures of styrene-acrylonitrile resin with butadiene-acrylonitrile rubber or graft copolymers of styrene and acrylonitrile on polybutadiene or butadiene-styrene copolymer), and the like. The chemicals may be added to lubricating oils, gasoline, fish oils, etc.

An indeed surprising advantage of the phenolic polyphosphite reaction products of the invention resides in their ability to be used in the prevention of deterioration of polyolefin plastics by both heat-oxidation and ultraviolet radiation. Thus, the phenolic polyphosphites of this invention are excellent heat stabilizers for polyolefins, having advantages over other substituted phenols including the trisphenolic monophosphites. The present polymeric phosphite reaction products have the surprisingly distinctive advantage of being efficient agents for stabilizing polyolefins, particularly polypropylene, against degradation and embrittlement caused by ultraviolet radiation.

The polyphosphites of this invention may be used alone or in combination with other stabilizers. Maximum protection against heat-oxidation is derived from combinations with other conventional stabilizers such as thiodipropionates, phenolic sulfides, and other similar chemicals.

Highly effective ultraviolet stabilizer systems may be produced by combining the phenolic polyphosphite compositions of the invention with other conventional ultraviolet stabilizers such as the substituted hydroxy benzophenones and benzotriazoles. Maximum protection against ultraviolet radiation is derived from combinations of the reaction products of the invention with thiodipropionate esters which may also contain small amounts of conventional ultraviolet absorbers such as the benzophenones or benzotriazoles. The benzophenones, which are (unlike the present polyphosphites) very expensive chemicals, may be used in concentrations as low as 20% of the manufacturer's recommended level yet give the same level of ultraviolet stability when used in combination with phenolic polyphosphite reaction products of this invention.

The unique combination of heat-oxidation and ultraviolet stability derived from the present polymeric phenolic phosphite reaction products makes them important products in the area of polyolefin stabilization. The ordinary phenolics, sulfides, and also the tris phenolic monophosphites of the previously referred to copending applications, are essentially ineffective against ultraviolet radiation. In some cases a phenolic can actually decrease ultraviolet stability and cause discoloration of the resin. One example of this is that the antioxidant 4,4'-thiobis-(6-t-butyl-m-cresol) causes polypropylene to become yellow-brown when exposed to ultraviolet light. On the other hand, the commercial ultraviolet stabilizers such as the benzophenones, benzotriazoles, and substituted acrylonitriles, are not effective as heat stabilizers.

The reaction products of the invention may be mixed with the polyolefin plastic in amounts that are conventional in the art of stabilizing polymers. Thus, it may be mentioned by way of non-limiting illustration that amounts of phenolic polyphosphite within the range of from 0.05 to 1% by weight of the plastic are frequently used for optimum effectiveness:cost ratio, although smaller amounts (e.g. 0.01% or less) or larger amounts (e.g. 5% or more) may also be used if desired, depending upon the degree of protection that is required in a given case. Each of the secondary stabilizers used along with the present phenolic polyphosphites may also be used in conventional amounts (by way of non-limiting example, from 0.1 to 1% based on the weight of the plastic although smaller amounts, e.g. 0.05, or larger amounts, e.g., 5%, may also be used) but it is a surprising advantage of the invention that a given desired level of protection can frequently be achieved with secondary stabilizers (in the presence of the phenolic polyphosphite-containing reaction products of the invention) in substantially smaller amounts than are usually recommended, thus making possible substantial savings in the usage of expensive secondary stabilizers, notably the benzophenone and benzotriazole ultraviolet light absorbers.

Particularly desirable secondary stabilizers are the dialkyl thiodipropionates, such as dimethyl thiodipropionate, dilauryl thiodipropionate, etc.

Other preferred secondary stabilizers are the conventional benzophenone ultraviolet absorbers, notably the hydroxy benzophenones, especially those having an hydroxy group in the 2-position although there may also be additional hydroxy substituents, for example in the 2'- or 4-position. Other substituents may also be present in conventional benzophenone ultraviolet absorbers, as is well known, notably one or more alkoxy groups, frequently in the 4- and 4'-positions. A typical conventional class of benzophenone stabilizers is that described in U.S. Pat.

3,218,294, Rodgers et al., Nov. 16, 1965, as having the formula

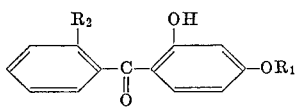

wherein $R_1$ is an alkyl radical of up to 18 carbon atoms, e.g., methyl, butyl, octyl, dodecyl and octadecyl, and $R_2$ is either hydrogen, methyl, carbomethoxy or carboethoxy. Those benzbophenones having an alkoxy group of from 8–12 carbon atoms which are either unsubstituted or have a methyl radical in the 2'-position are preferred. Example of benzophenone secondary stabilizers useful in the invention are 2,4-dihydroxybenzophenone, 2,2'-dihydroxy-4,4'-dimethoxybenzophenone, 2-hydroxy - 4 - n - octoxybenzophenone, 2-hydroxy-4-methoxybenzophenone, and 2,2', 4,4'-tetrahydroxybenzophenone.

Still further secondary stabilizers that may be present are the conventional benzotriazole types. Frequently these are 2- or 3-substituted benzotriazoles in which the substituent is based on a phenyl radical, notably a phenyl radical substituted with such bodies as hydroxy (frequently in the 2-position) alkyl or carboxyalkyl (frequently in the 3- or 5-position) as disclosed for example in Belgian Pats. 634,490, 645,505 or 645,506, and French Pat. 1,330,379. Among the typical conventional 2-(hydroxyphenyl)benzotriazole ultraviolet stabilizers may be mentioned 2-(o-hydroxyphenyl benzotriazole, 2-(2-hydroxy-5-methyl phenyl) benzotriazole, 2-(2-hydroxy-3-tert. butyl-5-methyl-phenyl) benzotriazole and such 2-[2-hydroxy-3-(carboxyalkyl) phenyl] benzotriazoles as 2-[2-hydroxy-3-(o-butoxy-carboxylphenyl)methyl-5-methyl phenyl] benzotriazole. Special mention may be made of the hydroxyarylbenzotriazoles of the formula

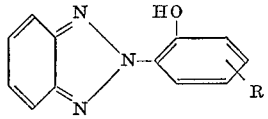

where R is an alkyl group, e.g., methyl, ethyl, propyl, butyl, etc.

While the phenolic polyphosphite-containing reaction products of the invention may be used as the sole stabilizers for the polymers described, the preferred form of the invention uses these polyphosphites in synergistic combination with the described thiodipropionates and/or benzophenones and/or benzotriazoles. If desired, more than one polyphosphite reaction product may be employed in any given case, and more than one synergistic additive may be employed (e.g., a thiodipropionate plus a benzo-phenone, or more than one of either or both).

The following examples will serve to illustrate the practice of the invention in more detail.

EXAMPLE I

Preparation of phenolic polyphosphite-containing reaction product by reaction of phosphorus trichloride with 2,5-di(tertiary-butyl) hydroquinone Materials:
    2,5-di(tertiary-butyl)hydroquinone—532 gms. (2.4 moles)
    phosphorus trichloride—176 gms. (1.28 moles)
    diphenyl phosphite catalyst—11 gms.
    chlorobenzene (solvent)—1000 ml.

Procedure: The chlorobenzene is added to a two-liter resin flask equipped with a reflux condenser, thermometer, dip tube and a nitrogen sweep. The 2,5-di(tertiary-butyl) hydroquinone is added to the solvent and the resulting slurry is agitated. With the slurry at room temperature, the full charge of phosphorus trichloride is added. Over the next 40–60 minutes the temperature of the reaction mixture is increased gradually to 90–110° C. Over the next hour, the reaction mixture is heated to a higher temperature of 130–145° C., then it is held at 130–145° C. for 2–6 hours additional.

The resulting solution is then stripped under 20 mm. Hg until all the solvent and residual HCl are removed. The molten product is removed from the reaction vessel, allowed to cool, and then ground into a fine white powder.

Product yield—96–98%
Melt range—80 to 120° C.
Percent phosphorus—6.52% (by weight)
Approximate ratio of OH/P—1.1 (mole/mole)
Estimated content of cross-linked material—10 to 15% (max.)

EXAMPLE II

Two step preparation of phenolic polyphosphite-containing reaction product of phosphorus trichloride with 2,5-di(tertiary-butyl) hydroquinone This example illustrates the preparation of a phenolic polyphosphite of the kind described in Example I, but by a different procedure. In Example I the phenolic polyphosphite was prepared by a one step method, whereas in this example the phenolic polyphosphite is prepared by a two-step method, involving first reacting the 2,5-di(tert-butyl) hydroquinone with sufficient phosphorus trichloride to form the monomeric phenolic phosphite (referred to herein as tris phenolic monophosphite), followed by a second stage in which the monomeric phenolic phosphite is further reacted with more phosphorus trichloride to form the phenolic polyphosphite-containing reaction product of the invention.

Materials:
    2,5-di(tertiary-butyl) hydroquinone—532 g. (2.4 m)
    phosphorus trichloride:
        Step 1—110 g. (0.8 m)
        Step 2—66 g. (0.48 m)
    diphenyl phosphite (catalyst)—11 g.
    chlorobenzene—1000 ml.

Procedure:

Step 1.—The chlorobenzene is added to a two liter resin flask equipped with a thermometer, reflux condenser, dip tube, and a nitrogen sweep. 2,5-di(tertiary-butyl) hydroquinone is charged, forming a solution-slurry due to the low solubility of the 2,5-di(tertiary-butyl) hydroquinone in the solvent. The slurry is heated to 50–80° C. and the phosphorus trichloride is added subsurface at a constant rate over 90–150 minutes. The temperature is increased slowly during this addition to 110–130° C. The reaction mixture is then heated to 130–145° C., and held for 2–4 hours at this temperature. The resulting intermediate product is composed largely of the monomeric tris phosphite or tertiary phosphite:

wherein R' is the 2,5-di(tert.-butyl) para-phenylene residue of the 2,5-di(tert.-butyl) hydroquinone.

Step 2.—The second charge of phosphorus trichloride is added to the produce of Step 1 subsurface over one hour while the reaction mixture is held at 130–145° C. for an additional 4–7 hours. The solution is then stripped under 20 mm. Hg pressure until all the solvent and residual HCl are removed. The molten polymeric product is then removed from the flask and allowed to solidify.

Product:
    Yield—96%
    Melt range—85–100° C.
    Percent phosphorus—6.1% by weight
    OH/P ratio—1.3 (mole/mole)

EXAMPLE III

Reaction product of $PCl_3$ (0.5 mole) and 1:1:1 molar reaction product of styrene, octene-1, and hydroquinone (1.0 mole)

(A) Preparation of substituted hydroquinone.—To a reaction flask equipped with heating mantle and reflux condenser is added 220 grams (2 moles) of hydroquinone, 224 grams (2 moles) of octene-1 and 22 grams of KSF/O activated montmorillonite catalyst powder. The reaction mixture is heated to 120° C. and an exothermic reaction occurs, raising the temperature to 145–155° C. The reaction mixture is held at 150–160° C. with refluxing for one hour after which 208 grams (2 moles) of styrene is added slowly over the next hour at a temperature of 110–140° C. The reaction mixture is then agitated for another hour at 140–150° C., cooled at 80° C. and diluted with benzene. The catalyst is filtered off, and the benzene and other volatiles distilled off at 245° C. and 10 mm. Hg pressure. The distillate contains (besides benzene) a mixture of unreacted hydroquinone, styrene and octene-1. Product yield is 494 grams, and the product is a viscous amber liquid.

(B) Preparation of polymeric phosphite.—To a reaction flask equipped with heating mantle is added 326 grams (1 mole of the reaction product of hydroquinone, octene-1 and styrene (1:1:1) described in A, above. The product is heated to 70–75° C. then 68.8 grams (0.5 mole) of phosphorus trichloride is added over a 25 minute period. Hydrochloric acid vapors are evolved immediately and the temperature is increased slowly over 1.5 hours to a temperature of 200° C. The reaction mixture is then stirred at this temperature for approximately 2.5 hours or until there is no HCl vapor coming off.

The product is then cooled to 100–160° C. and carbon dioxide gas is bubbled through the product for 1.5 hours to remove trace of HCl in the product. Yield is 340 grams of the polymeric phenolic phosphite-containing reaction product.

EXAMPLE IV

Reaction product of $PCl_3$ (0.5 mole) and 1:1:1 molar reaction product of hydroquinone, dodecene-1, and turpentine (1.0 mole)

(A) Preparation of substituted hydroquinone.—Use same equipment as in Example III(A). 220 grams (2 moles) of hydroquinone is added to 500 ml. of o-dichlorobenzene solvent containing 22 grams of KSF/O catalyst. The mixture is heated to 150–160° C. and 336 grams (2 moles) of dodecene-1 is added dropwise over one hour. The reaction mixture is stirred at 160° C. for another 30 minutes after which 272 grams (2 moles) of steam distilled turpentine is added over a 45 minute period at 155–160° C. After the addition is completed the reaction mixture is agitated for another hour at 160° C.

Then the reaction product is diluted with hexane and the catalyst filtered off. The solvents are distilled off and the reaction product topped at 250° C. and 10 mm. Hg pressure. The distillate contains (besides dichlorobenzene and hexane) unreacted hydroquinone and dodecene-1. Yield is 489 grams. The product is a viscous amber liquid.

(B) Preparation of polymeric phosphite.—Same equipment as in Example III(B). 414 grams (1 mole) of the 1:1:1 reaction product of hydroquinone, dodecene-1 and steam distilled turpentine described in A, above, is heated in a reaction flask to 70–75° C. Then 68.8 grams (0.5 mole) of phosphorous trichloride is added slowly over a 30 minute period. Reaction takes place and HCl vapors come off rapidly. The temperature is increased gradually over the next 1.5 hours to 200° C., and the reaction mixture is then held at this temperature for an additional 2.5 hours or until no HCl vapors come off. The product is then cooled to 100–160° C. and carbon dioxide gas is bubbled through the product for 1.5 hours to remove traces of HCl in the product. Yield of the polymeric phenolic phosphite-containing product is 422 grams. The product is a viscous amber liquid analyzing 76.4% C, 10.7% H, 11% O and 2.88% P.

EXAMPLE V

Reaction product of $PCl_3$ (0.5 mole) and 1:1:1 molar reaction product of hydroquinone, camphene, and $C_{16-20}$ alpha-olefins (1.0 mole)

(A) Preparation of substituted hydroquinone.—The reaction flask is equipped with heating mantle. 220 grams (2 moles) of hydroquinone is added to the flask along with 484 grams (2 moles) of mixed $C_{16-20}$ alpha-olefins, and 22 grams of KSF/O catalyst. The mixture is heated solwly to 170° C. and held at that temperature for one hour. Then 272 grams (2 moles) of molten camphene at 140–150° C. is added gradually over a two hour period. The reaction mixture is then stirred for an additional hour at 150° C., after which the product is diluted with benzene and the catalyst filtered off. The benzene is then distilled off and the product topped at 250° C. and 10 mm. Hg pressure. The distillate (other than benzene) contained 117 grams of unreacted mixed olefins, camphene and hydroquinone. Yield was 792 grams; the product was a viscous amber liquid.

(B) Preparation of polyphosphite.—To the reaction flask is added 488 grams (1 mole) of the substituted hydroquinone described in A, above (the reaction product [1:1:1] of hydroquinone, camphene, and $C_{16}$–$C_{20}$ mixed alpha-olefins). This product is heated to 70–75° C. and then 68.8 grams of phosphorous trichloride (0.5 mole), representing an excess of 50% of that required to form the monomeric tris-phosphite, is added slowly over 25–30 minutes. The temperature is then gradually increased over the next 1.5 hours (90 minutes) to a temperature of 190–200° C. The reaction mixture is held at this temperature for an additional 2.0 to 2.5 hours, or until no trace of HCl vapors are detected. The polymeric phenolic phosphite-containing product is then cooled to 100–160° C., and $CO_2$ gas is bubbled through the product to remove trace amounts of HCl contained in the product. Product yield is 498 grams, and product is a viscous amber liquid analyzing 78.4% C, 11.1% H, 8.0% O, and 2.61% P.

EXAMPLE VI

Preparation of reaction product containing cross-linked phenolic polyphosphite

This example illustrates the preparation of a reaction product containing a high content of cross-linked phenolic polyphosphite, from the same reactants as in Example I.
Materials:
  2,5-di (tertiary-butyl) hydroquinone—532 gm. (2.4 moles)
  phosphorous trichloride—210 gm. (1.52 moles)
  diphenyl phosphite (catalyst)—11 gm.
  chlorobenzene—1000 ml.

Procedure: The chlorobenzene is added to a two liter resin flask equipped with a thermometer, reflux condenser, dip tube, and a nitrogen sweep. The 2,5-di(tertiary-butyl) hydroquinone is charged, forming a solution-slurry due to the low solubility of the 2,5-di(tert-butyl) hydroquinone in the cold solvent. The slurry is then heated to 50–70° C. and the phosphorous trichloride is added subsurface over the next 2¼–4 hours at a constant rate. During this addition, the temperature is increased slowly to 80–100° C. The reaction mixture is then heated to 130–145° C. and held for 2–6 hours at this temperature. The solution is then stripped under 20 mm. Hg until all the solvent and residual HCl are removed. The product is then heated to 250–350° C. for 20–40 minutes under a nitrogen atmosphere. The resulting product is then removed from the reaction vessel and allowed to solidify. Upon grinding, the product becomes white crystalline powder melting >290° C.

Yield of product—90%
Percent phosphorus—7.2%
Approximate OH/P ratio—0.55%
Estimated content of cross-linked species—90%

EXAMPLE VII

This example illustrates the use of the present reaction products in the heat-oxidation stabilization of an olefin plastic. In these heat-oxidation tests three 90 mil compression molded discs of polypropylene (containing the stabilizer chemicals to be tested, as indicated in Table I, below mixed in on a roll mill) are placed in a forced draft hot air oven at 300° F. Failure time, measured as days, is the time required for two out of three discs to break (crumble and embrittle). The polypropylene employed is an unstabilized commercially available material known as Profax 6501 which is an isotactic polypropylene having a reduced specific viscosity of 3.0 and a melt index value of 0.4 at 190° C. Sample A in Table I below is a control, containing no stabilizer. Samples B and F are also controls, using a dialkyl thiodipropionate without the phenolic polyphosphite of the invention. Samples C, D, E and G represent the practice of the invention, using the 2,5-di (tertiary-butyl) hydroquinone polyphosphite reaction product prepared as in Example I. Samples H, F, J and K, included for purposes of comparison, utilize various chemicals other than the phenolic polyphosphite stabilizer of the invention. In sample H, chemical (a) is the monomeric 2,5 - di(tertiary - butyl) tris(phosphite) which is the intermediate in Example II, that is, the essentially monomeric reaction product of 2,5-di(tertiary-butyl) hydroquinone and $PCl_3$ in 3:1 mole ratio. In sample F, chemical (b) is tris-(2-methyl-4-hydroxy-5-tert. butyl phenyl) butane ("Topanol CA"). In sample J chemical (c) is 1,3,5-trimethyl-2,4,6-tris(3,5-di-tert. butyl-4-hydroxy benzyl) benzene "Ionox 330"). In sample K, chemical (d) is a commercial phenolic antioxidant containing nitrogen and sulfur, exemplified by the type 6 - (4 - hydroxy - 3,5 - di - tert. - butyl anilino) - 2,4 - bis(n-octyl thio) - 1,3,5 - triazine (see British Pats. 977,587 or 1,000,209) as represented by such materials as the commercially available white crystalline powder melting in the range of 49–52° C. known as "Irganox 1076."

TABLE I.—HEAT-OXIDATION STABILITY

| Sample | Additive to polypropylene | Days to failure at 300° F. |
|---|---|---|
| A | None (unstabilized polypropylene) | 1–2 |
| B | 0.4% DSTDP [1] | 14 |
| C | 0.4% DSTDP [1] plus 0.2% polyphosphite R.P. | 67 |
| D | 0.4% DSTDP [1] plus 0.2% polyphosphite R.P. | 112 |
| E | 0.4% DSTDP [1] 0.4% polyphosphite R.P. | 96 |
| F | 0.4% DLTDP [2] | 12 |
| G | 0.4% DLTDP [2] plus 0.1% polyphosphite R.P. | 70 |
| H | 0.4% DLTDP [2] plus 0.1% chemical (a) | 60 |
| I | 0.4% DLTDP [2] plus 0.1% chemical (b) | 54 |
| J | 0.4% DLTDP [2] plus 0.1% chemical (c) | 54 |
| K | 0.4% DLTDP [2] plus 0.1% chemical (d) | 47 |

[1] Distearyl thiodipropionate.
[2] Dilauryl thiodipropionate.

The results of the heat-oxidation tests shown in Table I illustrate the highly synergistic activity between the phenolic polyphosphite reaction product of the invention and the thiodipropionate esters. These combinations give excellent heat stability to polypropylene. This example may be repeated using polyethylene as the polyolefin plastic in place of isotactic polypropylene.

EXAMPLE VIII

This example demonstrates the use of the chemicals of the invention to confer resistance to ultraviolet radiation on organic high polymers. The polymer employed is the same polypropylene that was used in Example VII. Mill mixes of the polypropylene with various chemicals in amounts shown in Table II are prepared and molded into test specimens. The specimens are exposed in a Fadeometer and the number of hours to embrittlement (i.e., the point at which the samples crumble when bent 90°) is observed, with the results shown and in Table II. In sample L, a control, the polypropylene contains no stabilizing chemicals. Samples M, N, O, P, Q, R and U represent the practice of the invention, and contain the phenolic polyphosphite reaction product of the invention, prepared as in Example I. Samples S and T are not within the invention, but utilize other chemicals in place of the phenolic polyphosphite reaction product of the invention, for purposes of comparison. In sample S, chemical (a) is again the intermediate phenolic phosphite monomer from Step 1 of Example II. In sample T, chemical (b) is again as defined in Example VII ("Topanol CA"). In sample U, chemical (e) is a commercial benzophenone U.V. stabilizer, 2-hydroxy-4-n-octoxybenzophenone (Cyasorb UV531"). It will be seen from Table II that the phenolic polyphosphite-containing reaction product of the invention is effective alone (samples Q and R), and more so in combination with a thiodipropionate (samples M, N, O and P) or a benzophenone U.V. absorber (sample U). Comparing sample S (monophosphite) with sample M (polyphosphite) it can be seen that the polyphosphite reaction product of the invention gives improved results. This example may be repeated, using a phenolic polyphosphite made from 2,5-di(tertiary-amyl)hydroquinone in place of di(tertiary-butyl)hydroquinone. The example may be repeated, using other secondary stabilizers along with the phenolic polyphosphite in place of or in addition to the thiodipropionate ester, such as one or more 2-hydroxy-4-alkoxybenzophenones of the kind previously described and/or one or more 2-(2-hydroxy alkylphenyl)benzotriazoles of the kind previously described.

TABLE II
EXPOSURE TO ULTRAVIOLET RADIATION
(FADE-OMETER)

| Sample | Additive to polypropylene | Hours to embrittlement |
|---|---|---|
| L | None (unstabilized polypropylene) | 120–144 |
| M | 0.4% DLTDP [1] plus 0.2% polyphosphite R.P. | 644–716 |
| N | 0.4% DLTDP [1] plus 0.4% polyphosphite R.P. | 644–716 |
| O | 0.4% DSTDP [2] plus 0.2% polyphosphite R.P. | 644–716 |
| P | 0.4% DSTDP [2] plus 0.4% polyphosphite R.P. | 644–716 |
| Q | 0.4% polyphosphite R. P. | 290–330 |
| R | 0.25% polyphosphite R. P. | 220–290 |
| S | 0.4% DLTDP plus 0.2% chemical (a) | 264–312 |
| T | 0.4% DLTDP plus 0.2% chemical (b) | 216 |
| U | 0.25% polyphosphite R. P. plus 0.1% chemical (e). | >504 |

[1] Dilauryl thiodipropionate.
[2] Distearyl thiodipropionate.

In another test, not listed in Table II, a composition was prepared similar to sample M, but containing a product made by the procedure of Nelson 2,612,488 in place of the phenolic polyphosphate of the invention. Such product was made by reacting 1 mole of $C_8H_{17}$ substituted phenol with one mole of $PCl_3$ followed by reaction with one mole of 2,5-di(tert.-butyl)hydroquinone. The sample based on 0.2% of such product plus 0.4% DLTDP lasted 216–288 hours in the Fade-Ometer test, compared to 644–716 hours for sample M of the invention. In a heat aging oven test, the sample based on such product lasted 45 days at 300° F. compared to 70–80 days for the invention.

EXAMPLE IX

This example demonstrates the fact that whereas conventional ultraviolet absorbers are useless for heat stabilization, the present reaction products not only make possible a high order of stabilization against ultraviolet but at the same time make possible good heat stabilization. Molded test specimens of polypropylene, having the composition indicated in Table III, are subjected to the Fade-Ometer test and to hot air oven aging, with results as shown in Table III. In samples V and W, chemical (e) (the commercial benzophenone U.V. stabilizer, "Cyasorb UV531," identified in Example VIII) is shown to be effective for ultraviolet stabilization at a sufficiently high concentration, but absolutely no good for hot air aging. When a small amount of chemical (e) is combined with the polyphosphite reaction product of Example I, as in sample X, not only is the ultraviolet stabilizer improved but the resistance to heat aging starts to rise. Adding to the combination of sample X a small amount of dilauryl thiodipropionate as in sample Y produces not only a rise in ultraviolet resistance, but a truly remarkable increase in resistance to heat aging, to a value of 55 hours. This is much greater than the increase in heat age resistance produced by dilauryl thiodipropionate in chemical (e), as shown in sample Z. This example may be repeated using a phenolic polyphosphite prepared from styrenated hydroquinone in place of 2,5-di(tert. butyl)hydroquinone.

TABLE III.—ULTRAVIOLET STABILITY AND HOT AIR OVEN STABILITY

| Sample | Additive to polypropylene | Hours to embrittlement in Fade-Ometer | Days to failure in oven (300° F.) |
|---|---|---|---|
| V | 0.25% chemical (e) | 648 | 1 |
| W | 0.05% chemical (e) | 288 | 1 |
| X | 0.05% chemical (e) plus 0.2% polyphosphite | 432 | 4 |
| Y | 0.05% chemical (e) plus 0.2% polyphosphite R. P. plus 0.4% DLTDP. | 576 | 55 |
| Z | 0.2% chemical (e) plus 0.4% DLTDP. | 576 | 4 |

EXAMPLE X

This example shows results obtained in a sun lamp test, on polypropylene test specimens prepared as in the previous examples. The samples are mounted on a rotating table 10 inches below a new sun lamp. The surface temperature of the table is approximately 80° C. The time of failure is observed as the number of hours of exposure the sample will withstand before it becomes so embrittled that it cracks upon being bent to an angle of 90° at the center. Table IV, in which the phenolic polyphosphite reaction product employed is that of Example 1, summarizes the results.

TABLE IV.—SUNLAMP TEST

| Sample | Additive to polypropylene | Hours to embrittlement |
|---|---|---|
| AA | None (unstabilized polypropylene) | 48 |
| AB | 0.25% polyphosphite R. P | 152 |
| AC | 0.4% DSTDP plus 0.2% polyphosphite R. P. | 226–274 |
| AD | 0.4% DLTDP plus 0.2% polyphosphite R. P. | 226–274 |
| AE | 0.25% chemical (e) | 274–322 |
| AF | 0.1% chemical (e) plus 0.25% polyphosphite R. P. | 466–600 |
| AG | 0.5% chemical (e) | 514–650 |

The sunlamp exposure tests of Table IV illustrate the unusual effectiveness of mixtures of the phenolic polyphosphite reaction product of the invention with the substituted benzophenone U.V. absorber, chemical (e) ("Cyasorb UV531," identified in Example VIII). The benzophenone alone at 0.25% concentration (sample AE) is about three fifths as effective as the combination of only 0.1% benzophenone with 0.25% phenolic polyphosphite reaction product of the invention, sample AF. This combination (AF) performs almost as well as the high (0.5%) concentration of the expensive benzophenone used in sample AG. This example may be repeated using a phenolic polyphosphite prepared from terpenated hydroquinone in place of 2,5-di(tert. butyl)hydroquinone, or using a different substituted benzophenone as the secondary stabilizer, such as 2 - hydroxy - 4 - dodecyoxy-2'-methyl benzophenone.

Having thus described our invention, what we claim and desire to protect by Letters Patent is:

1. A composition comprising a polyolefin plastic containing, in amount effective to stabilize said plastic, a phenolic polyphosphite having the formula $$P_x(ORO)_y(OROH)_z$$

wherein $x$ is at least 2 and is equal to $2y/3$ plus $z/3$, and $z$ is a whole or fractional multiple of $x$ in the range from 0.25 to $2x$, R is the same or different in each —ORO— group and is a substituted para phenylene radical of the formula

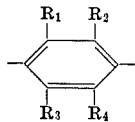

wherein $R_1$, $R_2$, $R_3$, and $R_4$ are the same or different and are selected from the group consisting of hydrogen, alkyl having up to 18 carbon atoms, alpha-methyl benzyl, alpha, alpha-dimethyl benzyl, and terpenyl having 10 carbon atoms, at least one of $R_1$, $R_2$, $R_3$, and $R_4$ being other than hydrogen.

2. A composition as in claim 1 in which the said phenolic polyphosphite is of linear structure and has the formula

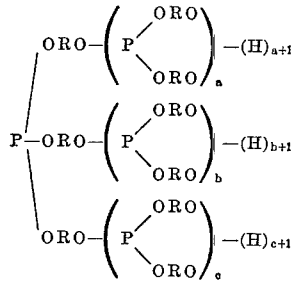

where R is as defined in claim 1, and $a$, $b$ and $c$ are zero or whole numbers adding up to from 1 to 20, at least one of $a$, $b$ and $c$ being other than zero.

3. A composition as in claim 1, in which the phenolic polyphosphite molecules contain an average of from 2 to 10 phosphorus atoms.

4. A composition as in claim 1, in which the phenolic polyphosphite molecules contain an average of from 5 to 10 phosphorus atoms.

5. A composition as in claim 4, in which the mole ratio of hydroxyl content to phosphorus content in the product is from 1 to 1.6.

6. A composition as in claim 1 in which the said phenolic polyphosphite is a cross-linked structure wherein at least some of the phosphorus atoms in the said formula are present as a unit having the structure

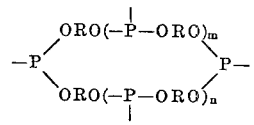

wherein $m$ and $n$ are zero or small whole numbers and R is as defined in claim 1, and the mole ratio of hydroxyl content to phosphorus content is from 0.3 to 0.9.

7. A composition as in claim 1 further containing at least one secondary stabilizer selected from the group consisting of (I) dialkyl thiodipropionates and
(II) substituted benzophenones of the formula

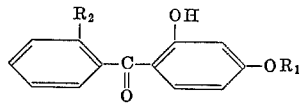

wherein $R_1$ is an alkyl radical of up to 18 carbons and $R_2$ is hydrogen or methyl.

8. A composition as in claim 7 wherein the secondary stabilizer is (I) as defined therein.

9. A composition as in claim 7 wherein the secondary stabilizer is (II) as defined therein.

10. A composition as in claim 1 wherein the polyolefin plastic is isotactic polypropylene.

11. A composition as in claim 4 in which the polyolefin plastic is isotactic polypropylene, further containing at least one secondary stabilizer selected from the group consisting of.
(I) dialkyl thiodipropionates and
(II) substituted benzophenones of the formula

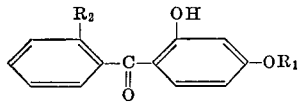

wherein $R_1$ is an alkyl radical up to 18 carbons and $R_2$ is hydrogen or methyl.

12. A composition as in claim 11, in which the substituted para phenylene radical is a 2,5-dialkyl para phenylene radical in which the alkyl groups contain up to 18 carbon atoms.

13. A composition as in claim 12 in which the alkyl groups are tertiary butyl groups.

References Cited

UNITED STATES PATENTS

| | | | |
|---|---|---|---|
| 3,297,631 | 1/1967 | Bown et al. | 260—45.95 |
| 3,367,996 | 2/1968 | Strauss et al. | 260—887 |
| 3,435,097 | 3/1969 | Bottomley et al. | 260—887 |
| 3,467,735 | 9/1969 | Hunter | 260—953 |

HOSEA E. TAYLOR, Primary Examiner

R. A. WHITE, Assistant Examiner

U.S. Cl. X.R.

260—45.85, 45.95, 897